May 23, 1972  A. W. GUSTAFSON  3,664,532
PROPULSION MEANS FOR BALL RETRIEVING APPARATUS
Filed July 24, 1970  2 Sheets-Sheet 1

INVENTOR
AUGUST W. GUSTAFSON
BY
ATTORNEY

May 23, 1972   A. W. GUSTAFSON   3,664,532
PROPULSION MEANS FOR BALL RETRIEVING APPARATUS
Filed July 24, 1970   2 Sheets-Sheet 2

INVENTOR
AUGUST W. GUSTAFSON

BY
ATTORNEY

3,664,532
PROPULSION MEANS FOR BALL
RETRIEVING APPARATUS
August W. Gustafson and Edna L. Gustafson, both of 4750 Baldwin Blvd., Corpus Christi, Tex. 78408
Filed July 24, 1970, Ser. No. 57,955
Int. Cl. B60p 1/00
U.S. Cl. 214—356
6 Claims

ABSTRACT OF THE DISCLOSURE

A ball retrieving mechanism in the form of a self propelled vehicle having a tricycle type running gear with the ball gathering and retrieving means arranged between the front wheel and the rear driving wheels so that the balls are picked up before the rear driving wheels pass over the ground area from which the balls are recovered.

---

The present invention relates to apparatus for retrieving balls lying on a practice field and more particularly pertains to a self propelled mechanism for picking up golf balls from the ground.

An object of the invention is to provide apparatus of a self propelled type wherein the power unit and the operator which constitute the heaviest portion of the equipment is arranged rearwardly of the ball gathering and retrieving structure to avoid having the power unit serve to press balls into the turf.

Another object of the invention is to provide an assembly for applying a propulsion force to a ball gathering and retrieving mechanism and at the forward portion thereof so that the direction of movement may be controlled from a position at the rear of the ball retrieving mechanism.

A further object of the invention is to provide a steering mechanism for a ball retrieving mechanism so constructed that power applied from the rear for moving the ball gathering an retrieving mechanism over the ground will not interfere with the steering of the ball retrieving mechanism.

Other objects and features of the invention will be appreciated and become apparent as the present disclosure proceeds and upon consideration of the accompanying drawings taken in conjunction with the following detailed description wherein an embodiment of the invention is disclosed.

Figure 1:
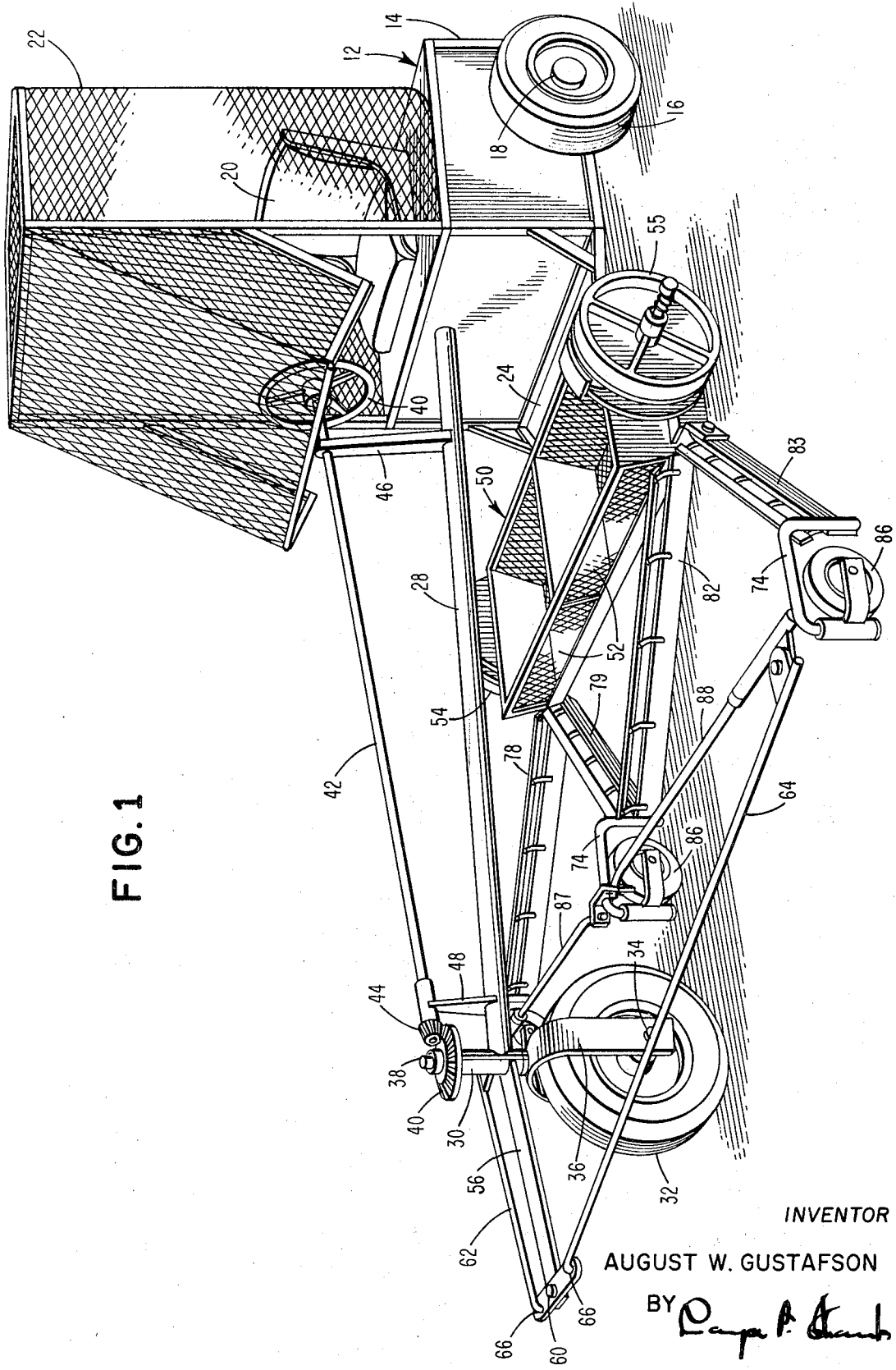
FIG. 1 is a perspective view of a ball retrieving mechanism and propulsion unit embodying the invention.

The apparatus includes a power unit 12 which may take the form of a battery supplied electric motor or an internal combustion engine supported within an area defined by a frame diagrammatically indicated at 14. A pair of rear drive wheels 16 are driven by axle elements 18 which are operatively connected to the power unit 12. A seat 20 for the driver is secured to the frame 14 and the area above the seat is enclosed by an open mesh cage 22 for protecting the operator. The rear wheels 16 support the power unit and the operator for rolling movement. A foot rest 24 for the driver extends forwardly from the lower part of the frame 14. The drive means and controls therefor may be of any conventional construction.

An elongated and substantially horizontally disposed strut 28 extends forwardly from the frame structure 14. A sleeve 30 is rigidly affixed to the forward free end of the strut 28 and extends upwardly therefrom. A front steerable wheel 32 is mounted for rotation on an axle pin 34 which is supported by the free ends of an inverted U-shaped bracket 36. The bracket 36 is provided with an upstanding pin 38 which is journalled for rotation in the sleeve 30. A beveled pinion gear 40 is secured to the upper end of the pin 38. The steerable wheel 32 is manipulated by a steering wheel 40 which is operatively connected to the front wheel 32 by a rod 42 and a gear 44 which meshes with the pinion gear 40. The steering rod 42 is supported by brackets 46 and 48 which extend upwardly from the strut 28.

Figure 2:
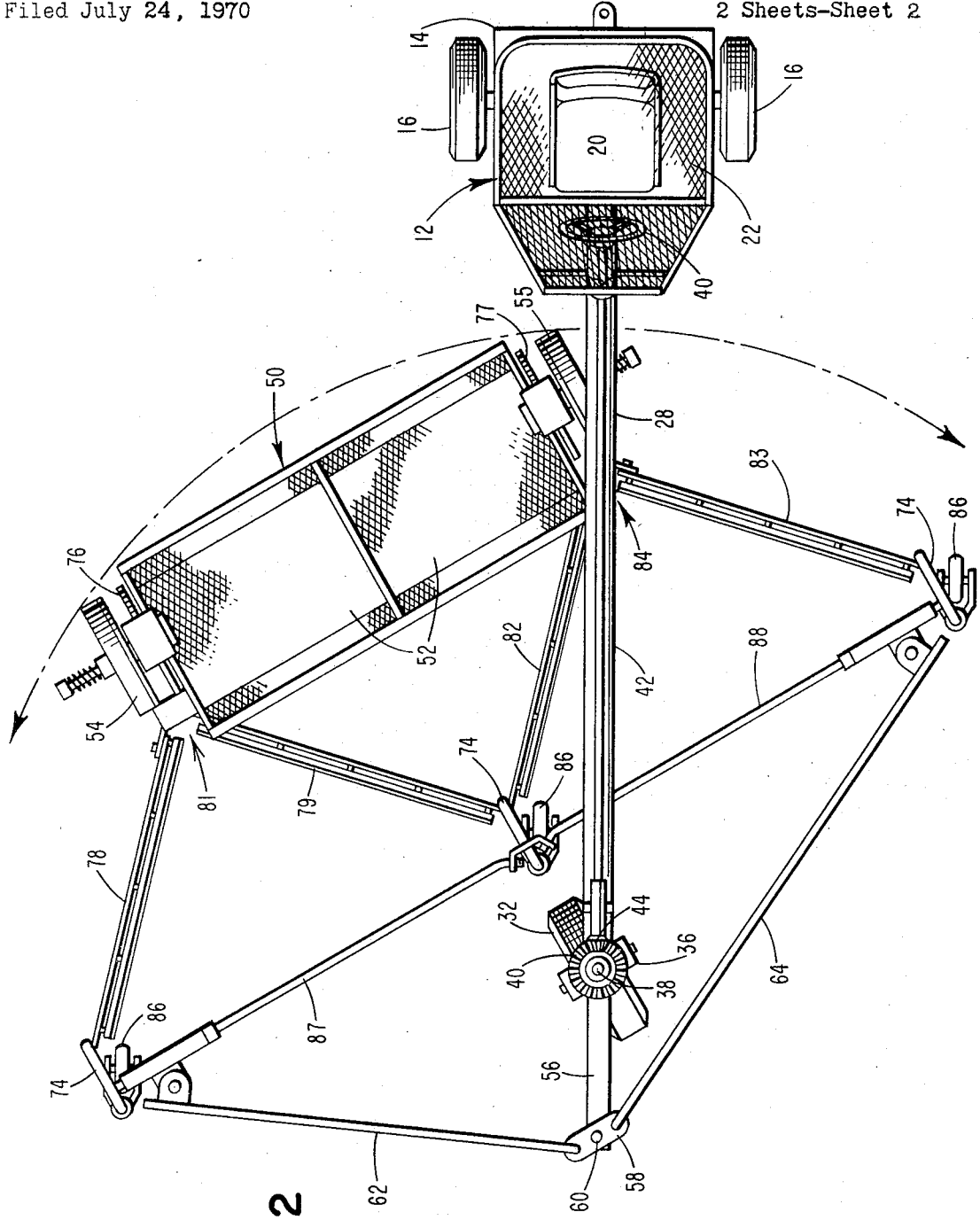
FIG. 2 is a plan view illustrating the manner in which the ball gathering and retrieving mechanism swings in negotiating a departure from a straight forward movement of the equipment.

The ball gathering and retrieving assembly is indicated generally at 50 and is supported between the front wheel 32 and the rear wheels 16 in such a manner that this assembly pivots with the wheel 32 and about the vertical axis of the pin 38. In the embodiment shown in the drawings the gathering and retrieving assembly includes a pair of receptacles 52 supported by wheels 54 and 55. The receptacles 52 and the ball gathering structures are connected to the forward end of the strut 28 for swinging movement with the wheel 32. A bar 56 extends forwardly from the sleeve 30 in alignment with the strut 28 as will be apparent from consideration of FIG. 2. A link 58 is pivotally supported at the free forward end of the bar 56 by means of a pin 60. A tie rod 62 extends from one end of the link 58 and a tie rod 64 extends from the other end of the link 58. The bar 56 and the tie rods 62 and 64 and the strut 28 serve to transmit the thrust provided by the power unit to the ball gathering and retrieving mechanism 50.

The wheels 54 and 55 support the rear portion of a frame in which the receptacles 52 are nestled for rolling movement over the ground. The wheel 54 cooperates with a disc 76 and the wheel 55 cooperates with a disc 77 to lift the balls. The diverging plates 78 and 79 serve to diver and gather the balls into a zone indicated at 81 and forwardly of the space between the wheel 54 and the disc 76. The plate 82 and the plate 83 serve to laterally shift balls lying on the ground into a zone indicated at 84 and forwardly of the space between the wheel 55 and the disc 77. The forward portions of the plates which serve to deflect the balls are supported by castor type wheels 86 carried by brackets 74. The wheels 86 support the forward portion of the ball gathering means for rolling movement. The wheels are journalled for rotation by suitable bracket means and rods 87 and 88 tie the forward portion of the ball gathering structure together. The tie rods 62 and 64 are suitably connected to the tie members 87 and 88.

In operation, the operator seated on the seat 20 and the power unit serve to impose the greatest weight of the apparatus on the rear wheels 16. As the wheels 16 are driven to urge the apparatus forwardly, the ball gathering and retrieving assembly 50 is pulled forwardly by the trust applied through the strut 28 and the bar 56 and the tie rods 62 and 64. The operator by turning movements of the steering wheel 40 may cause the forward steering wheel 32 to assume various planes of rotation and the wheel 32 swings about the vertical axis of the pin 38. The balls are deflected into positions immediately forwardly of the wheels 54 and 55. These wheels in cooperation with the respective discs 76 and 77 lift the balls and deliver them into the receptacles 52 as disclosed and claimed in my application Ser. No. 52,683 filed July 6, 1970. The balls are thus recovered from the practice field before the load applied on the rear driving wheels 16 may pass over any balls that may be lying on the ground and which would otherwise be pressed into the turf.

While the invention has been described with reference to particular structural features, it will be appreciated that changes may be made in the elements as well as the overall assembly. Such modifications and others may be made without departing from the spirit and scope of the invention as set forth in the appended claims.

What is claim and desired to be secured by Letters Patent is:

1. Apparatus for retrieving balls lying on the ground comprising a pair of drive wheels, power means operatively connected to said drive wheels, a steering wheel, an elongated strut extending forwardly of said drive wheels, a third wheel pivotally mounted near the forward end of said strut, means connecting said third wheel with said steering wheel, ball collecting means independently wheel supported forwardly of said drive wheels, and means for pivotally connecting the ball collecting means to the forward end of the strut whereby the ball collecting means is pulled in front of the drive wheels as the apparatus moves forward over the ground and follows the path of the third wheel as it turns about a vertical axis in response to the steering wheel.

2. The apparatus of claim 1 wherein said ball collecting means comprises a receptacle for balls, diverging guide members extending forward from the ends of the receptacle, castor wheel supports for the forward ends of the guide members, and said means for pivotally connecting the ball collecting means to the strut are tie rods extending from the castor wheel support to the strut.

3. The apparatus of claim 2 wherein a tie member extends inwardly from each castor wheel support to a third centrally disposed castor wheel support, rearwardly diverging guide plates extend between the said centrally disposed support and the ends of said receptacle, and the said tie rods are pivotally secured to the tie members.

4. The apparatus of claim 1 wherein bevelled gears connect a steering rod to a rotatable vertical shaft carrying the third wheel.

5. The apparatus of claim 1 having a seat and an open mesh cage adapted to enclose a driver supported above the drive wheels.

6. The apparatus of claim 1 comprising a steering rod extending forwardly above the strut to adjacent a vertical shaft rotatable about a vertical axis and carrying the third wheel, a gear on the end of the steering rod meshing with a pinion rigidly secured to the vertical axis, said ball collecting means comprising an independently wheel supported receptacle, guide members attached to the receptacle adapted to divert balls to the ends of the receptacle and extending forward therefrom, and a pair of tie rods extending forwardly from the guide members and pivotally mounted on the strut.

References Cited
UNITED STATES PATENTS

| | | | |
|---|---|---|---|
| 3,175,714 | 3/1965 | Wittek | 214—356 |
| 2,744,582 | 5/1956 | Sheppard | 180—27 X |
| 1,896,419 | 2/1933 | Pinson | 180—27 X |
| 1,614,333 | 1/1927 | Worthington | 56—7 |

ALBERT J. MAKAY, Primary Examiner

U.S. Cl. X.R.

56—328; 180—27